Feb. 20, 1923.
A. V. HINMAN.
TEAT CUP.
FILED MAR. 12, 1919.
1,446,295.
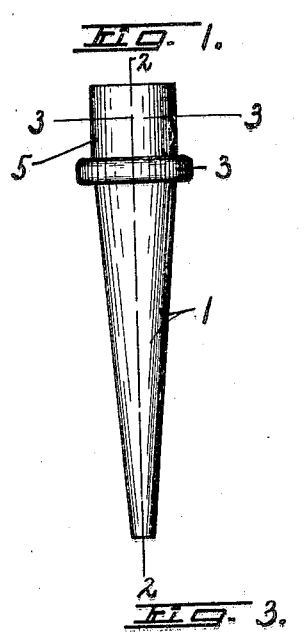
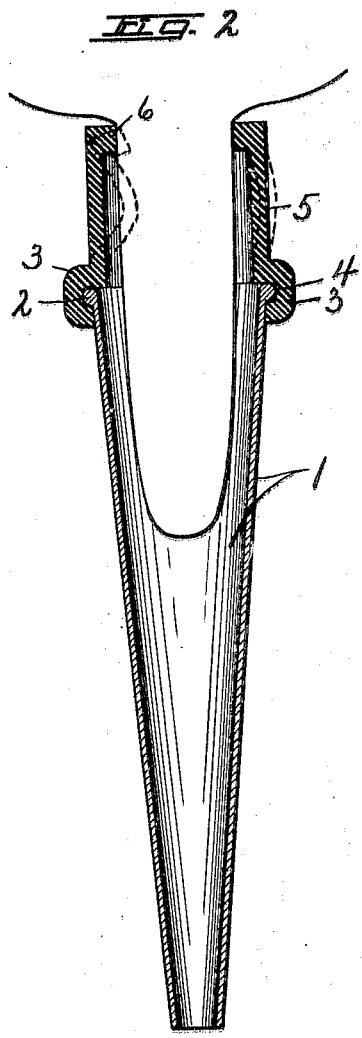
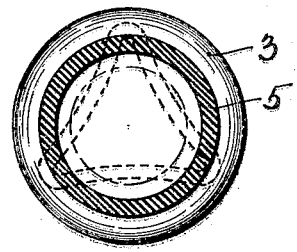
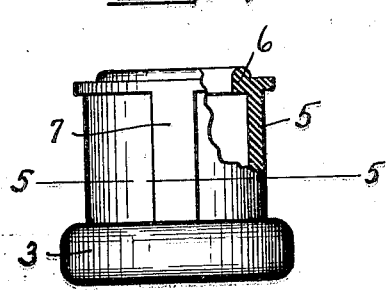
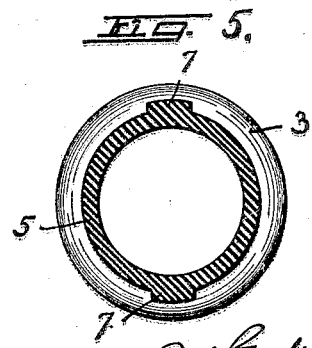
INVENTOR
Arthur V. Hinman
BY Denison Thompson
ATTORNEYS Patented Feb. 20, 1923.

1,446,295

UNITED STATES PATENT OFFICE.

ARTHUR V. HINMAN, OF ONEIDA, NEW YORK, ASSIGNOR TO THE HINMAN MILKING MACHINE COMPANY, OF ONEIDA, NEW YORK, A CORPORATION OF NEW YORK.

TEAT CUP.

Application filed March 12, 1919. Serial No. 282,135.

*To all whom it may concern:*

Be it known that I, ARTHUR V. HINMAN, of Oneida, in the county of Madison, in the State of New York, have invented new and useful Improvements in Teat Cups, of which the following, taken in connection with the accompanying drawings, is a full, clear, and exact description.

This invention relates to certain improvements in teat cups such as are used in connection with machines for milking cows.

With the usual commercial teat cup withdrawal of air from the cup causes a material relative movement between the cup and teat. The suction draws the teat so far down into the cup as to cause the animal discomfort, and decreases the efficiency of the milking operation.

No one so far as I am aware, has ever produced a teat cup by which the suction applies a gripping pressure at the base of the teat, preventing the cup from drawing up toward the udder. The pressure being applied at the base of the teat prevents relative movement of the teat and teat cup whereas with present cups gripping the teat throughout its lower portion the suction is ultimately applied to the lower end of the teat causing it as stated to draw down into the cup.

The primary object of the invention is, therefore, to produce a teat cup having a new method of operation in the performance of milking, whereby the milk is rapidly drawn from the teats of the animal with less discomfort to the animal and more efficiently than with known teat cup.

The milking operation is accomplished more rapidly and without discomfort to the animal by the application of material pressure solely to the upper portion of the teat, and when that part of the teat is gripped, the relative position of the teat and teat cup during that portion of the pulsation is established.

It has been generally customary to form teat cups with a rigid casing supporting an internally arranged collapsible lining. As distinguished from such cups the one of my invention operates to accomplish the milking operation in an entirely different manner in that the collapsible part constitutes the upper end of the cup and is carried by a lower preferably rigid part. So far as I am aware, I am the first to construct a teat cup having a collapsible part adapted to grip the upper portion of the teat while the lower part may remain free and unconfined by contacting parts, the upper collapsible part determining the relative position of the parts when suction is applied.

Other objects and advantages relate to the details of construction and operation of the device, as will more fully appear from a consideration of the following specification taken in connection with the accompanying drawings in which Figure —1— is an elevation of a teat cup of my invention.

Figure —2— is a cross-section on line 2—2 Figure —1—.

Figure —3— is a cross-section on line 3—3 Figure —1— illustrating in dotted lines the manner in which the upper portion of the teat cup ordinarily collapses.

Figure —4— is an elevation partly in section of a slightly modified form of collapsible part.

Figure —5— is a cross-section on line 5—5 Figure —4—.

The illustration of my invention set forth in the accompanying drawings discloses a tapered metallic tube —1— having its upper and larger end provided with an external circular bead —2— adapted to be engaged by a circumferentially enlarged part —3— formed with an internal channel —4— receiving the bead. The part —2— in this illustration is formed as a portion of a collapsible member —5— of substantially cylindrical form and provided with an inturned flange —6— at its upper end forming a central opening preferably of somewhat less diameter than the interior diameter of member —5— and through which opening the teat of the animal is adapted to be passed. The interior surface of member —5— may perhaps preferably form a substantially symmetrically continuation of the adjacent interior surface of tube —1—.

It is found in operation that the member —5— naturally collapses to form a three sided or somewhat triangular vertical chamber, the sides of which are vertically concave. When the suction is applied this part immediately collapses and tightly grips the teat, while the lower portion of the teat remains free thereby avoiding or preventing any material relative movement of the teat and teat cup.

The simplest and perhaps preferred form of collapsible member is shown in Figures —1—, —2— and —3—. That form shown in Figures —4— and —5— differs in the fact that the member is provided in this instance with two diametrically opposite vertical ribs —7— and the flange at the upper end is of slightly different form. The operation of these members is found to be substantially the same.

As descriptive of an exact construction of such member as shown in Figure —1—, the entire member may be formed of rubber. The radial thickness of part —2— may be substantially 5/32 of an inch: the radial thickness of the cylindrical part —5— may be substantially 4/32 of an inch: and the vertical thickness of flange —6— may be approximately 6/32 of an inch. These measurements are, however, susceptible of wide variation, the essential feature of my invention being the collapsible member at the upper end of a teat cup for gripping the upper portion of the teat.

Altho I have shown and described a specific construction of teat cup as illustrative of my invention, I do not desire to limit myself to any special construction, form, relative proportion or size of the parts or to any particular material from which the same shall be formed, as wide variations, modifications and changes may be made, while retaining the essentials of my invention and without departing from the scope of the same as set forth in the appended claims.

What I claim is:

1. A teat cup consisting of a rigid tubular body and a self-supporting flexible inwardly collapsing tubular portion positioned above the rigid tubular body, and secured to the upper end of the same, and having an inwardly extending circumferential flange at its upper end.

2. A teat cup consisting of a rigid tubular body and a self-supporting flexible inwardly collapsing relatively long tubular portion positioned above the rigid tubular body, and of substantial uniform diameter through its projection above said body, and secured to the upper end of the same, and having an inwardly extending circumferential flange at its upper end, and reinforcing ribs extending longitudinally of said tubular portion.

3. A teat cup consisting of a tubular body, and a self-supporting flexible inwardly collapsing relatively long tubular portion positioned above the rigid tubular body, and of substantial uniform diameter throughout its projection above said body and secured to the upper end of the said body, and having an inwardly extending circumferential flange at its upper end.

In witness whereof I have hereunto set my hand this first day of March 1919.

ARTHUR V. HINMAN.

Witnesses:
ENOCH H. JOHNSON,
LILLIAN R. BENTLEY.